Nov. 15, 1960

R. LUCIEN 2,960,290

SELF-REGULATING BRAKING SYSTEM FOR THE
WHEELS OF AIRCRAFT AND THE LIKE

Filed July 25, 1955

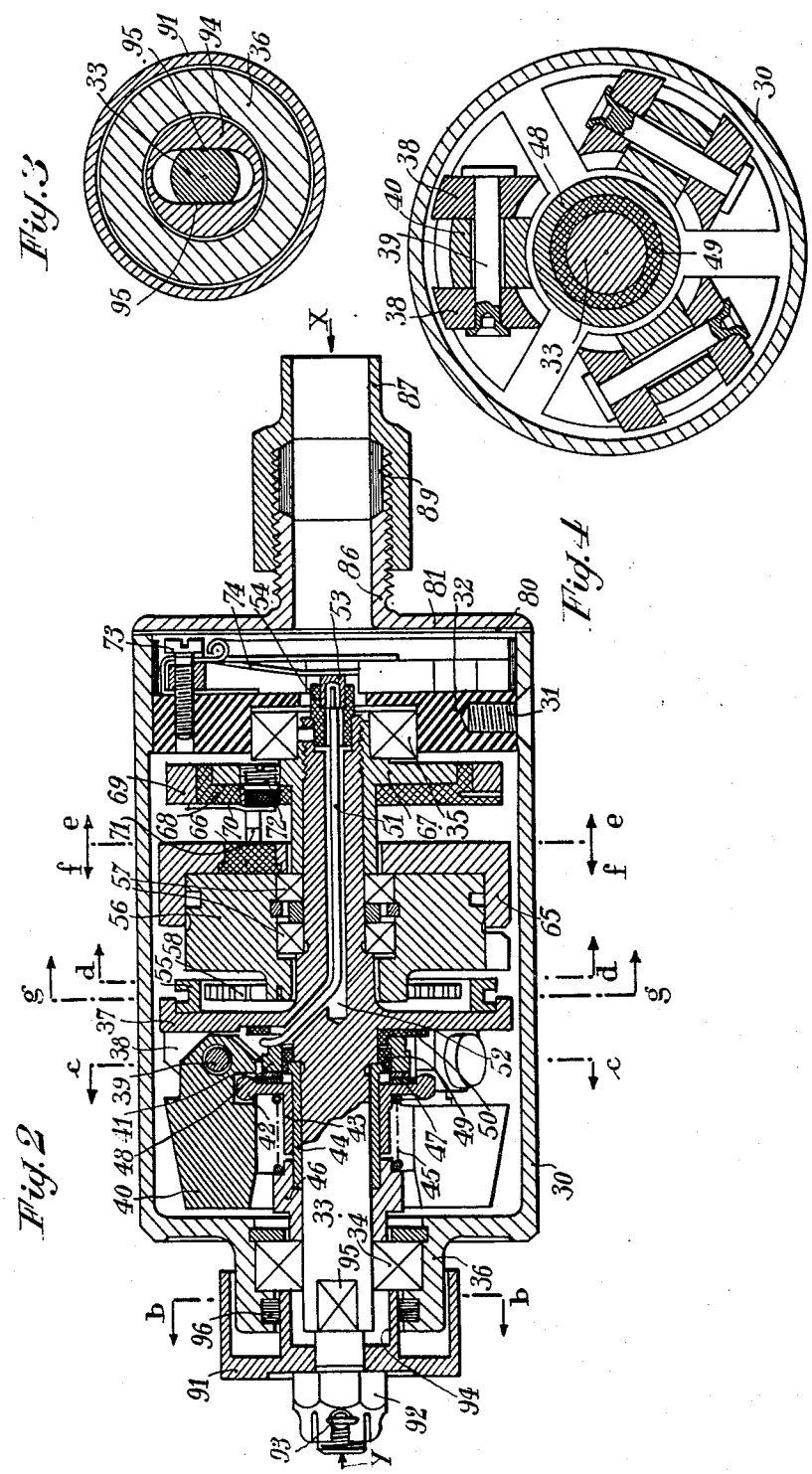

Nov. 15, 1960    R. LUCIEN    2,960,290
SELF-REGULATING BRAKING SYSTEM FOR THE
WHEELS OF AIRCRAFT AND THE LIKE
Filed July 25, 1955    5 Sheets-Sheet 3
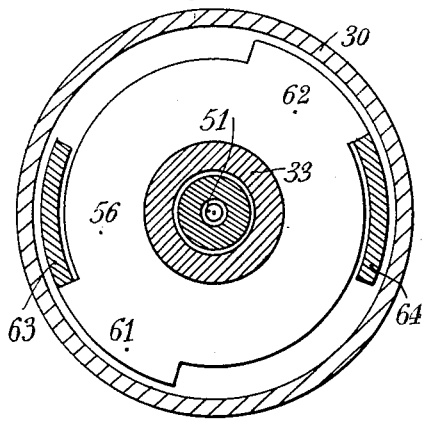
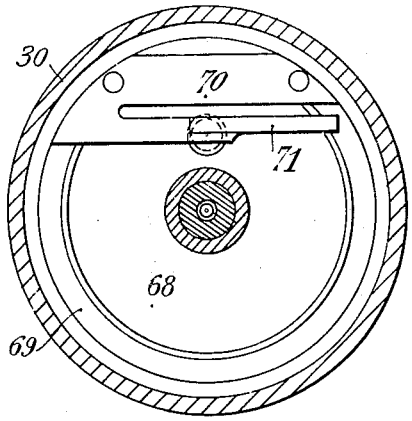
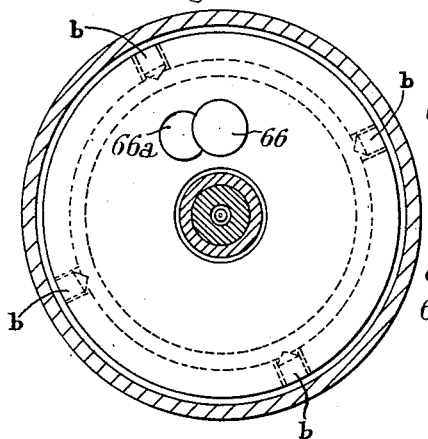
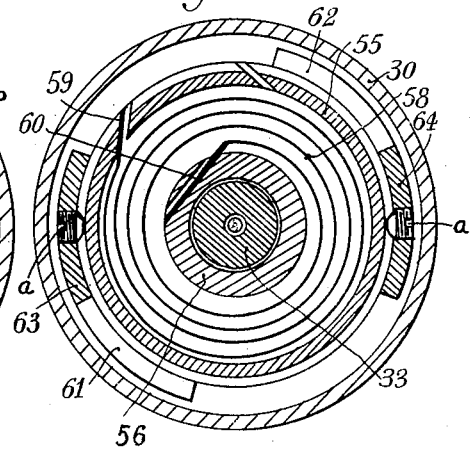
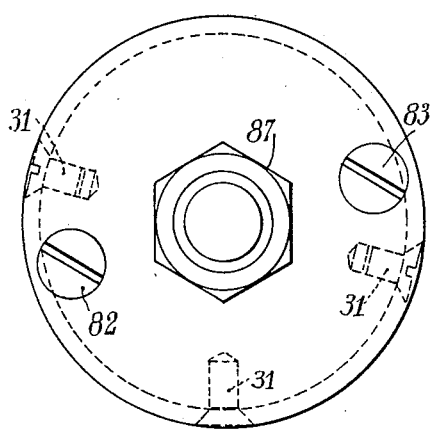

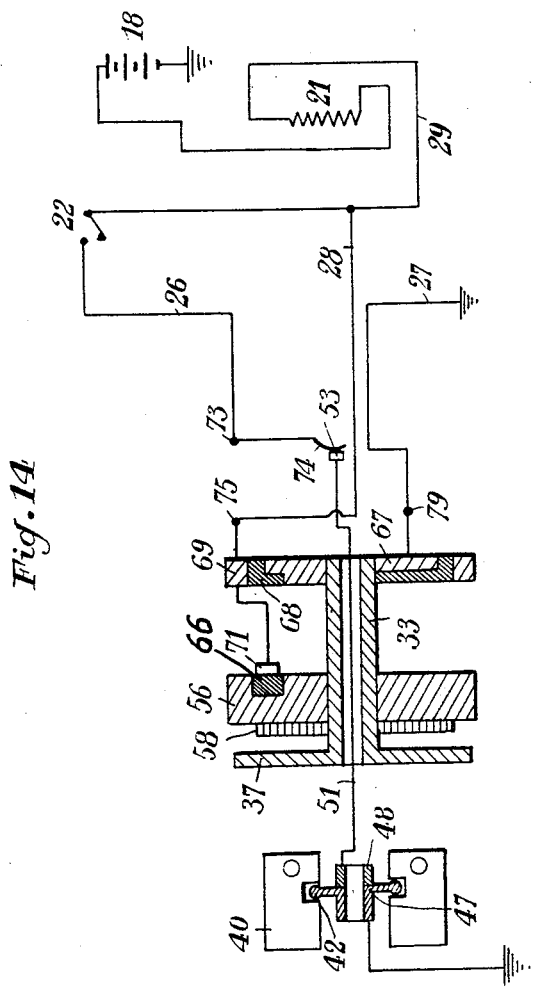

United States Patent Office 2,960,290
Patented Nov. 15, 1960

2,960,290

SELF-REGULATING BRAKING SYSTEM FOR THE WHEELS OF AIRCRAFT AND THE LIKE

Rene Lucien, Neuilly sur Seine, France, assignor to Societe d'Inventions Aeronautiques et Mecaniques S.I.A.M., Fribourg, Switzerland, a corporation of Switzerland Filed July 25, 1955, Ser. No. 524,227

Claims priority, application France Aug. 9, 1954

15 Claims. (Cl. 244—111)

The invention relates to systems intended to ensure a means of controlling the braking of aircraft wheels by the use of an inertia effect, in order to avoid skidding of the wheels on the ground.

It will be recalled that in these systems, the deceleration of the wheel causes the braking action to be reduced when it reaches a certain value corresponding to the value at which skidding takes place, after which, when the deceleration becomes less, the braking action is once more applied, and so on the procedure being repeated, as soon as skidding of the wheel tends once more to take place.

It is also known that this procedure, which ensures an automatic and reasonable control of the braking action during the rolling of the wheels on the ground, may fail and may even be the cause of serious accidents when, the system of inertia control comes into action and releases the braking effect after contact of the wheel with the ground, the aircraft happens to make a rebound. In this case, in fact, and if the rebound is of relatively long duration, the deceleration decreases rapidly and the braking effect may thus automatically be re-applied before the wheel again becomes in contact with the ground. In these circumstances, it is necessary to introduce an auxiliary safety device which prevents the wheel from being braked when the aircraft again makes contact with the ground. The presence of this auxiliary device enables the pilot, when about to land, to apply the control of the braking before the landing is made, and this without any drawback.

In addition, this device must satisfy the following conditions:

(a) It must nevertheless enable the pilot to lock the wheels during flight by the usual braking operation before the landing gear is retracted;

(b) It must enable the normal evolutions to be carried out on the ground as long as the braking action is not excessive;

(c) Any accidental breaking or any failure of supply in the electric circuit which affects the control of the hydraulic braking circuit must have as its result to place the said hydraulic circuit again in the ordinary conditions of operation.

The system in accordance with the present invention satisfies all these safety requirements.

On the contrary, in certain known systems, in which the alternate operations of braking and release of braking are mainly effected by means of a kinematic transmission of inertia effects to valves, admission and exhaust valves respectively, of the hydraulic circuit which controls the brakes, the system in accordance with the invention is essentially characterised by the fact that the actions applied, both by the main device for avoiding skidding and by the auxiliary safety device referred to above for eliminating the disadvantages of a rebound, are directly and solely transmitted over an electric path to a single electromagnetically operated spill valve or electro-valve interposed in the hydraulic braking circuit and alternately controlling the application of pressure or the connection to exhaust of this circuit.

By virtue of this exclusive use of the electrical transmission system and due to this convergence of the said control actions, both main and auxiliary, towards a single electromagnetically operated spill valve or electro-valve, the system in accordance with the invention eliminates the mechanical complexity of the known systems and ensures a particularly simple construction of the automatic braking regulator, while at the same time it fulfils all the conditions recited above.

In its main principles, the self-regulating system of braking aircraft wheels in accordance with the invention is constituted by the combination of the following main members:

(1) An electromagnetically operated spill valve or electro-valve included in the hydraulic braking circuit.

(2) A main switch or inertia device, operating by the effect of inertia and connected on the supply circuit of the said electromagnetically operated spill valve or electro-valve, and constituted essentially by a shaft fast for rotation with the wheel, and a fly-wheel adapted to be displaced angularly with respect to the shaft between two limiting positions, the action of this main switch preventing skidding of the wheel on the ground.

(3) In shunt to the electric circuit which connects the main switch to the electromagnetically operated spill valve or electro-valve, a second switch or rotation responsive device of the centrifugal type with weight heads which are free of any forces directed axially of the wheel, controlled in response to the speed of rotation of the wheel so as to be closed when this speed is less than a predetermined speed.

(4) A third switch or auxiliary safety device mounted in series with the second, and actuated by the position of the shock-absorber system of the aircraft, so as to be open when the latter is resting on the ground and closed when the aircraft is in flight.

A self-regulating braking system possessing all the above features is shown in the attached drawings.

Fig. 2 is an axial cross-section of the brake controller proper.

Figs. 3 to 8 are transverse cross-sections of Fig. 2 and respectively following the cross-section lines b—b, c—c, d—d, e—e, f—f and g—g.

Figs. 9 and 10 are respectively end views looking in the direction of the arrows X and Y.

Fig. 14 illustrates a circuit diagram of the wiring of the self-regulating system of the invention.

Figure 1:
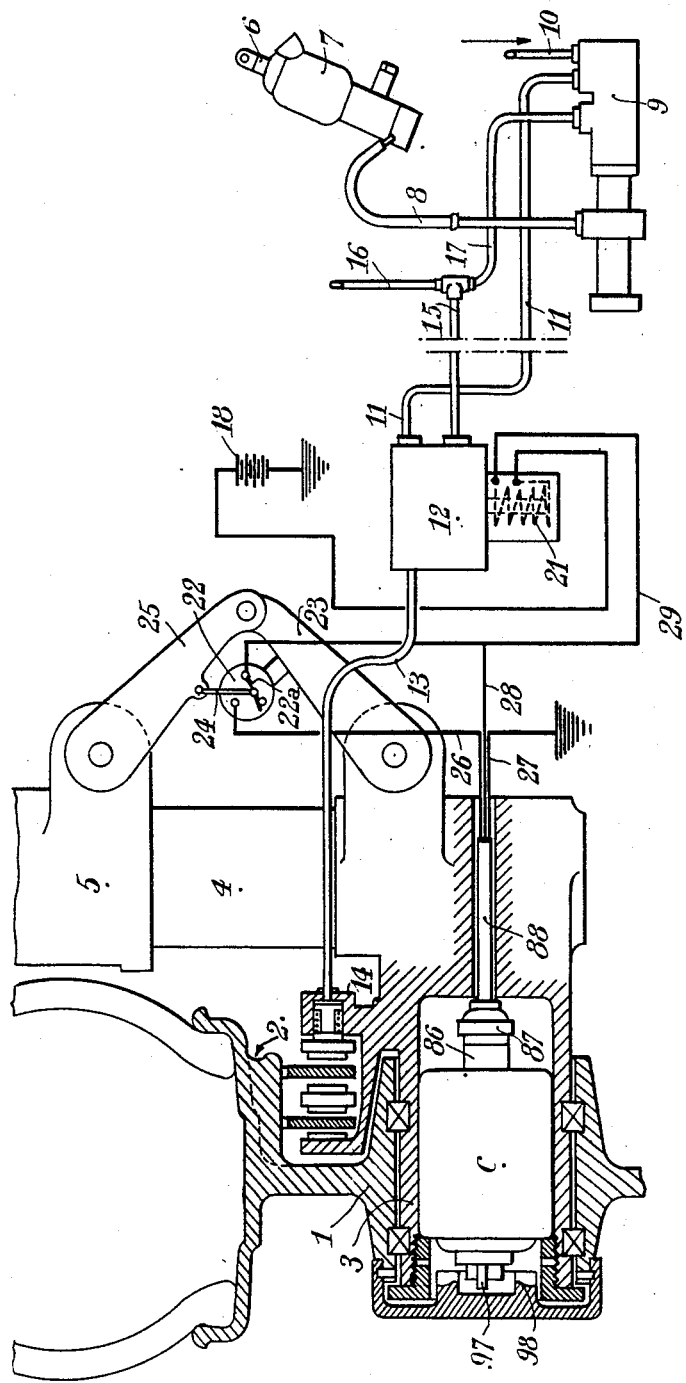
Fig. 1 is a diagrammatic view of the system.

With reference to Fig. 1, the wheel with its arrangement of disc brakes is shown at 1, the whole assembly being indicated by the reference 2. The wheel rotates freely about the journal shaft 3 which is coupled to the aircraft by the shock-absorber piston 4, movable in the body 5 of the shock-absorber. The hydraulic braking is controlled by the pilot by means of a pedal (not shown) fitted to the rod 6 of a piston which moves inside the cylinder 7 and actuates the hydraulic distributor 9 through the medium of a fluid which fills the conduit 8.

When the pilot operates the pedal, the pressure of the fluid is applied through the conduit 11 to an electromagnetically operated spill valve or electro-valve 12 which, when it is not energised, directs the pressure through the conduit 13 to the brake cylinder 14. Braking is thus effected. When the pilot no longer operates the pedal, pressure is no longer applied to the conduit 11; the liquid in the conduit 13 is then put to exhaust through the distributor 9 by the conduits 17 and 16.

As the electromagnetically operated spill valve or electro-valve 12 does not in itself form one of the objects of the invention, it will not be necessary to describe it in detail.

The excitation of the electromagnetically operated spill valve or electro-valve 12 has the effect of establishing a communication between the conduits 13 and 15, that is to say of placing the conduit 13 to exhaust and, in consequence of suppressing the braking action, even if the pilot continues to act on the brake pedal. This excitation is effected, as will be explained later, by the action of the brake controller C, housed in the journal shaft 3 of the wheel.

The electric circuit is made up as follows and reference is made to Fig. 14:

A source of electrical energy 18, which has been shown as a battery but which could be a direct or alternating current dynamo, has one of its poles connected to ground and the other coupled to one of the terminals of the electro-magnet 21 of the electro-valve 12. The other terminal of the electro-magnet is connected by a conductor 29 to one of the terminals of a switch 22, which is operated as a function of the position of the suspension. By way of example, this switch 22, see Fig. 1, has been shown in the drawing in one of the arms 23 of the compass system of the shock-absorber 5. The finger 22a of this switch 22 is connected through a crank-arm 24 to the other arm 25 of the compass system of the shock-absorber. The second terminal of the switch 22 is connected through 26 to a terminal of the braking controller C.

In addition to this terminal, the braking controller comprises, at one of its extremities, two further terminals, one of which is connected to ground at 27 and the other is connected at 28 to the conductor 29. The switch 22 is coupled to the compass system of the shock-absorber in such manner that the contact can only be made when the aircraft has left the ground, that is to say when the angle of the arms of the compass system has been sufficiently opened out by the expansion of the shock-absorber.

The braking controller C will now be described with reference to Figs. 2 to 13. This controller is composed of a casing 30 which is fixed and stationary in the journal shaft of the axle, Fig. 2 being directed with respect to the wheel in the same sense as Fig. 1. In this casing, a cylindrical member 32 of insulating material is fixed by means of screws 31. In the axis of the casing 30 is mounted a shaft 33 between two bearings 34 and 35, one of which is housed in an extension 36 of the casing 30 and the other in the insulating member 32.

To the shaft 33 is rigidly coupled a disc 37 carrying pairs of cheeks uniformly spaced around the axis, between the arms 38 of which are fixed the pivots 39; on these pivot shafts are mounted weight-heads 40 provided with slots 41. These slots engage with the edge of a disc 42 carried by a sleeve 43 which slides on a tube 44 rigidly fixed to the shaft 33. A spring 45 abuts against a ring 46 fixed to the shaft 33 and tends to push back the disc 42 against a ring 48 rigidly fixed to the shaft 33 but electrically insulated from this shaft by a ring 49, and from the disc 37 by a washer 50. One bare extremity of an insulated wire 51 is soldered on the ring 48, and passes through the shaft 33 in a conduit 52. The other extremity of this wire is soldered to a conducting stud 53 which is insulated from the shaft 33 by an insulating ring 54. On the facing sides of the disc 42 and the ring 48 are respectively arranged two washers 47 made of metal of high conductivity and which provide, when they are in contact, a good electrical connection between the two members. As seen in Figs. 2 and 4, the line connecting the center of gravity of each weight-head 40 when at rest with the center of its pivot 39 is parallel to the wheel axis, thereby to free the weight-heads 40 of any influence by forces directed axially of the wheel.

On the disc 37 is fixed a ring 55 by means of grub screws a which permit of rotation of the ring 55 and retain it in the cylindrical parts 63 and 64 which will be referred to later. A fly-wheel 56 is mounted freely on the shaft 33 by means of a ball bearing 57. Inside the ring 55 is arranged a spiral spring 58, one end of which is engaged in a slot 59 which passes through the ring 55 (see Fig. 8), whilst the other end is engaged in a slot 60 formed in the hub of the fly-wheel 56. The spring is wound in such a direction that if the fly-wheel 56 is displaced with respect to the shaft 33 in the direction of the arrow f (see Fig. 10), the spring expands. The fly-wheel 56 is provided with two symmetrical bosses 61 and 62 (see Fig. 5). The disc 37 carries on its edge two diametrically-opposite sections of a cylinder 63, 64, having a length such that their extremities pass into the annular space swept out by the bosses 61, 62 of the fly-wheel 56 when it rotates. When at rest, the spring 58 is initially preloaded in such manner that the bosses 61, 62 are respectively in contact with the cylindrical parts 63 and 64. On the fly-wheel 56 is fixed a bowl 65, the bottom of which carries an insulating button 66, also note Fig. 14, level with its external face. Preloading of the spring 58 can be adjusted to the desired value by rotating the ring 55 between the abutments 63 and 64 and setting the ring in position with screws a (Fig. 8) while dead travel of the fly-wheel 56 can be adjusted by relative rotation of bowl 65 and fly-wheel 56 and setting them in position with screws b (Fig. 7). In contact with button 66 over a portion of its lateral surface and also level with the external face of the bowl 65, is a contact stud 66a (see Fig. 7) made of special metal of such nature that it is not damaged by the sparks due to the breaking of the electric circuit which takes place at this point.

On the shaft 33 is fixed a sleeve 67 (see Fig. 14) with a circular flange (see Figs. 12 and 13) which serves as a support for an insulating disc 68 enclosed by a conducting ring 69. On this ring is fixed a thin plate 70 (see Fig. 6) which is split so as to form a tongue 71 and acting as a spring and suitably bent at its centre so as to apply a slight pressure against the bottom of the bowl 65. This pressure is adjustable by means of the insulated screw 72 thereby to vary the damping effect. On the insulating member 32 is fixed by a screw 73 (see Fig. 11) a conducting blade 74 acting as a spring which presses against the conducting stud 53. In the same way, a conducting blade 76 is fixed by a screw 75 to the insulating plate 32, the blade forming a spring which presses against a carbon brush 77 (see Fig. 13) and presses it against the conducting ring 69; a conducting blade 78 fixed by a screw 79 also presses against a carbon brush 80 and holds it against the conducting flange 67 (see Fig. 12).

Figure 11:
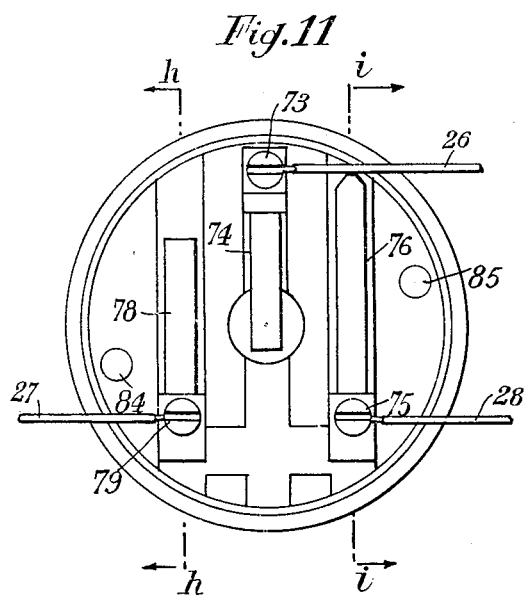
Fig. 11 is an end view looking in the direction of the arrow X with the base of the casing removed.
Figure 13:
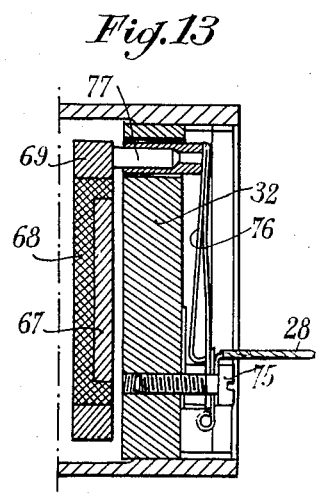
Figs. 12 and 13 are cross-sections taken respectively along the lines h—h and i—i of Fig. 11.
Figure 12:
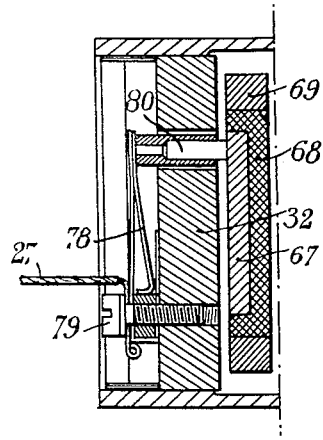
Figure 10:
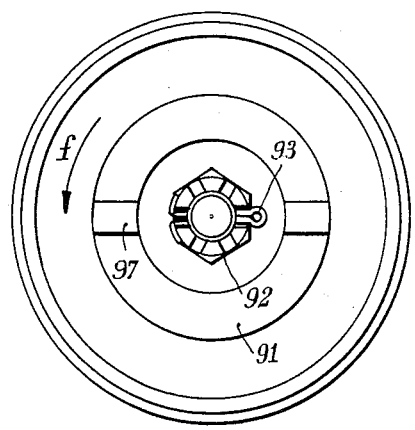

The casing 30 is closed by a plate 81 retained in position by the screws 82 and 83 (see Fig. 9) screwed into the holes 84 and 85 (see Fig. 11). The plate 81 has an end portion 86 on which is fitted a sleeve 87. The three insulated conductors 26, 27 and 28 of Fig. 1 are enclosed in a sheath 88 which passes through the sleeve and the end portion. The sheath is held fixed in position by a rubber ring 89 compressed by the sleeve 87 which thus forms a tight joint. The bared ends of the wires 26, 27 and 28 are respectively clamped under the heads of the screws 73, 79 and 75. The extension 36 of the casing 30 is provided with a cap 91 fixed on the end of the shaft 33 by a nut 92 which is locked in position by a pin 93. The cap 91 has a central part 94 which is cylindrical on its outer side and forms internally an oblong cavity, the sides of which fit over two flats 95 (see Fig. 3) formed on the shaft 33. A felt washer 96 ensures the fluid-tightness of the casing 30. The cap 91 is provided on its exterior with two shoulders 97 (see Fig. 10) which are engaged in two corresponding mortices of the cap 98 of the wheel (see Fig. 1). The shaft 33 is thus made fast for rotation with the wheel 1.

By the connections of the wires 26, 27 and 28 to the terminals 73, 79 and 75, two circuits in parallel have been created starting from the wire 29.

Referring to Fig. 14, the first circuit, starting at one end of the electromagnet, passes over the wires 29 and 28, the terminal 75 through (as shown in Fig. 2), the blade 76, the brush 77, the ring 69, and ground, is completed through the battery 18 to the other end of the electromagnet. The second parallel circuit starting from the same end of the electromagnet as the first circuit passes over the wire 29, the shock-absorber switch 22, the wire 26, the terminal 73, the blade 74, the contact stud 53, the wire 51, the insulated ring 48 and ground through the disc 42 of the sleeve 43 and being completed to the other end of the electromagnet through the wire connecting the battery 18 thereto.

The aircraft being stationary or travelling along the ground at a speed lower than the predetermined speed, the shock-absorber is compressed and its switch 22 is opened, thus breaking the second parallel circuit. The first circuit is also broken since the spring contact 71 of the fly-wheel inertia switch is retained on the insulating button 66 by the force of the spiral spring 58. No current can pass to the coil of the electro-magnet 21 and the brake can thus be applied in the usual way.

When the aircraft travels along the ground at the predetermined speed or a higher speed, the weight-heads 40 move outwards away from the axis of the wheel by abutting against the disc 42 they urge it against the spring 45 and the ring 48 is disconnected from ground. The second parallel circuit, which is already broken, is broken in addition for this second reason. Braking can still be effected, but under the control of the inertia fly-wheel switch: as long as the wheel and the fly-wheel rotate at the same speed, the current remains cut-off also in the first parallel circuit, but if the deceleration of the wheel becomes too great, which is an indication of the beginning of skidding, the inertia fly-wheel tends to rotate more quickly than the wheel so that the spring 71 leaves the insulating button 66 and contacts bowl 65 and fly-wheel 56 completing the circuit to ground and the current then passes in the first parallel circuit; the electro-magnet 21 is then energised and the pressure falls in the brake cylinder 14. The wheel can then accelerate once more until the spring 71 comes into contact with the insulating button 66 and the current is again broken, and so on.

If the aircraft rebounds, the shock-absorber extends so that the shock-absorber contact 22 closes. The current then passes to the electro-magnet 21. This prevents the wheel from being locked due to braking. In fact, if the speed of rotation of the wheel falls below a predetermined valve, the weight-head contact would again be closed and, as the two contacts in series would be both closed, the second parallel circuit would come into action; the electro-magnet 21 would be energised and the pressure would fall in the brake cylinder 14.

Whilst the wheel is subjected by the braking controller to repeated alternations of braking and release of braking, the current is cut-off and restored a large number of times at very short intervals which, in practice, amount to several times per second. Each time the current is broken, a breaking spark is produced at the point at which the spring blade contactor 71 leaves the metal base of the bowl 65 to pass on to the insulating button 66. It is for that reason that there is inserted in the bottom of the bowl 65, at the point at which the interruption of the current takes place, a contact stud 66a of special metal which has a particularly high resistance to the breaking spark.

It will be noted that the electric circuit is very simple and especially it will be seen that the electro-magnet 21 for releasing the brake is excited without the intermediary of any relay, contrary to the known devices of this kind.

The device may clearly have alternative forms in the constitution and the arrangement of the members and the composition of the electric circuits, without however departing from the scope of the invention.

The invention has also for its object an improvement in mechanical apparatus, the driving agent of which is a liquid under pressure. It is known that these apparatus are influenced in their operation by conditions of temperature. In particular, low temperatures increase the viscosity of the liquid and thus result in faulty working.

The invention is applied to apparatus of this kind, and in particular of the type previously described, in which the circulation of the liquid is controlled by means of electro-valves. It has been found that, at temperatures of the order of —25° C. and below, to which aircraft are frequently subjected, defects are produced in the operation of the brakes which are controlled by self-regulating devices. In accordance with the invention, these drawbacks may be removed if the precaution is taken of leaving the coils of the electro-valve energized, even when the apparatus is not in use.

By virtue of the invention, the heat generated by the flow of current through the coils is transmitted by conduction to the distributor and to the piping system, and the liquid thus preserves the fluidity necessary for the satisfactory working of the hydraulic equipments.

The application of the invention to self-regulating braking systems for aircraft wheels of the kind described above has only been given by way of example. The invention may clearly be applied to all mechanical apparatus having a hydraulic motor controlled by electro-valves.

What I claim is:

1. A braking control unit for a brake associated with a wheel, a hydraulic brake-actuating circuit, an inertia device operatively connected with the wheel and an electric circuit for releasing the brake to prevent skidding and an auxiliary safety device operatively connected with the wheel and the electric circuit for preventing brake actuation with the wheel unloaded, a rotation responsive device operatively associated with the wheel and circuit for preventing brake actuation with the wheel rotating at less than a predetermined speed: an electrically actuated valve in the electrical circuit having one position at which the hydraulic circuit is connected to apply the brake and another at which the hydraulic circuit is on exhaust, and an electrical valve-actuating circuit for transmitting to the valve exclusively through the electrical circuit the mechanical actions of the inertia device, the safety device and the rotation responsive device which is free of any forces directed axially of the wheel.

2. The unit claimed in claim 1 further comprising a hollow stationary shaft for supporting the wheel for rotation, said shaft defining a housing for said inertia device, said auxiliary safety device and said rotation responsive device.

3. The unit claimed in claim 1 wherein the inertia device comprises a main electric switch inserted in the electrical circuit and consisting essentially of a shaft rotatable with the wheel, a fly-wheel displaceable angularly on the shaft, a pair of abutments limiting the angular range of displacement of the fly-wheel on the shaft, and cooperating electrical contact members on the fly-wheel and on the abutments.

4. The unit claimed in claim 3 wherein the rotation responsive device comprises a second electric switch in parallel with the main switch and consisting essentially of a centrifugal governor, said governor comprising a pair of weight heads which are free of the forces directed axially of the wheel a pair of electrical contact members, and means connecting the governor to the wheel and to one of the contacts to close the second switch with the wheel rotating at less than said predetermined speed, 5. The unit claimed in claim 1 wherein the rotation responsive device comprises an electric switch inserted in the electrical circuit and consisting essentially of a centrifugal governor, a pair of electrical contact members, and means connecting the governor to the wheel and to one of the contacts to close the switch with the wheel rotating at less than said predetermined speed.

6. The unit claimed in claim 5 wherein the inertia device comprises a main electric switch inserted in the electrical circuit and consisting essentially of a shaft rotatable with the wheel, a fly-wheel displaceable angularly on the shaft, a pair of abutments limiting the angular range of displacement of the fly-wheel on the shaft, and cooperating electrical contact members on the fly-wheel and on the abutments.

7. The unit claimed in claim 6 wherein the auxiliary safety device comprises a third electric switch in parallel with the main switch and consisting essentially of a shock absorber supporting the wheel, a pair of electrical contact members, and means connecting the shock absorber to the wheel and to one of the contacts to close the third switch in response to the position of the wheel.

8. The unit claimed in claim 7 wherein the means for transmitting the actions of the auxiliary safety device to the valve consist essentially of the third electric switch in series with the first-mentioned or second switch and means connecting the shock absorber to the third switch to open the latter with the wheel bearing load and to close it when the wheel is not bearing a load.

9. The unit claimed in claim 1 wherein the electro-valve comprises an actuating coil in the electrical circuit in heat exchange relationship with the hydraulic circuit, the coil being permanently energized to ensure satisfactory operation of the hydraulic circuit even at low temperatures.

10. The unit according to claim 5 including a shaft, a disc coupled to said shaft for rotation therewith, a pair of weight heads pivotally coupled to said disc for rotation about said coupling in response to the rotation of said shaft, a spring biased member slidable on said shaft when said wheel rotates above said predetermined speed, said member having end portions which are coupled to said weight heads, said weight heads controlling the movement of said end portions in a direction parallel to the axis of said shaft and being free of any influences of the forces directed axially of the wheel.

11. The unit according to claim 1 wherein the rotation responsive device comprises an electrical switch inserted in the electrical circuit and a centrifugal governor connected to the wheel and responsive to the rotation thereof to close said switch with the wheel rotating at less than said predetermined speed, tot shaft rotatable with the wheel, a disc rigidly coupled to said shaft and provided with a pair of cheeks, a pair of weight heads provided with a slot and each being pivotally coupled to a respective one of said cheeks, said switch comprising a stationary contact and a slidable contact, said slidable contact comprising a member having a pair of projections and slidable on said shaft, each of said projections engaging a respective one of said slots for causing said member to slide on said shaft in response to the rotation of said weight heads relative to their respective cheeks when the wheel rotates at a speed at or greater than said predetermined speed, the line connecting the center of gravity of each said weight heads with the center of its pivot is parallel to the wheel axis thereby to eliminate any effect on said weight heads of forces directed longitudinally of the wheel axis.

12. The unit according to claim 1 wherein the inertia device comprises a main electric switch inserted in the electric circuit and consisting essentially of a shaft rotatable with the wheel, a fly-wheel displaceable on said shaft, and means for varying the damping effect comprising an elastic member fixed to said shaft for applying pressure to said fly-wheel, and a pressure adjusting device for varying the pressure applied by said elastic member to said fly-wheel.

13. The unit according to claim 12 wherein the elastic member comprises a thin plate having a projecting tongue portion, a conducting ring fixed to said shaft, and said thin plate being fixed to said ring.

14. The unit according to claim 3 including a disc provided with a pair of abutments fixed to said shaft, a ring provided with a spring rotatable relative to said disc, means including grub screws for retaining said ring relative to said disc, said fly-wheel being provided with a second pair of abutments cooperating with said first pair of abutments for limiting said angular range of said fly-wheel, said ring being effective for pre-loading said spring by rotation between said first pair of abutments for engagement with said second pair of abutments for a predetermined position of said fly-wheel thereby to prevent hunting thereof.

15. The unit according to claim 14 including means for setting said ring in position to preload said spring and means for adjusting the dead travel of said fly-wheel comprising a bowl rotatable relative to said fly-wheel and means fixing said bowl to said fly-wheel.

References Cited in the file of this patent

UNITED STATES PATENTS

| | | |
|---|---|---|
| 2,295,725 | Eksergian | Sept. 15, 1942 |
| 2,687,047 | O'Connor | Aug. 24, 1954 |
| 2,692,100 | Trevaskis et al. | Oct. 19, 1954 |
| 2,744,699 | Lucien | May 8, 1956 |

FOREIGN PATENTS

| | | |
|---|---|---|
| 1,059,736 | France | Nov. 10, 1953 |
| 63,402 | France | Apr. 6, 1955 |
| | (1st addition to No. 1,059,736) | |